US011888266B2

(12) United States Patent
Bergner et al.

(10) Patent No.: US 11,888,266 B2
(45) Date of Patent: Jan. 30, 2024

(54) CONNECTOR SHIELDING WITH A GUIDING PROTRUSION

(71) Applicants: TE Connectivity Germany GmbH, Bensheim (DE); TE Connectivity India Private Limited, Karnataka (IN)

(72) Inventors: Bert Bergner, Rimbach (DE); Sundareshan M D, Karnataka (DE); Gururaj A. Hiremath, Karnataka (IN)

(73) Assignees: TE Connectivity India Private Limited, Bangalore (IN); TE Connectivity Germany GmbH, Bensheim (DE)

( * ) Notice: Subject to any disclaimer, the term of this patent is extended or adjusted under 35 U.S.C. 154(b) by 113 days.

(21) Appl. No.: 17/004,647

(22) Filed: Aug. 27, 2020

(65) Prior Publication Data

US 2021/0098942 A1 Apr. 1, 2021

(30) Foreign Application Priority Data

Aug. 27, 2019 (EP) .................................... 19193936

(51) Int. Cl.
*H01R 13/6582* (2011.01)
*H01R 13/631* (2006.01)

(52) U.S. Cl.
CPC ....... *H01R 13/6582* (2013.01); *H01R 13/631* (2013.01)

(58) Field of Classification Search
CPC .......................... H01R 13/6582; H01R 13/631
See application file for complete search history.

(56) References Cited

U.S. PATENT DOCUMENTS

| | | | | | |
|---|---|---|---|---|---|
| 7,695,319 | B1 * | 4/2010 | Yang | H01R 13/6278 | 439/607.37 |
| 8,979,594 | B2 * | 3/2015 | Tsai | H01R 12/724 | 439/660 |
| 9,667,000 | B1 | 5/2017 | Morello et al. | | |
| 9,979,134 | B2 * | 5/2018 | Yu | H01R 13/6585 | |
| 10,797,449 | B2 * | 10/2020 | Chuang | H01R 13/6594 | |
| 2006/0189211 | A1 * | 8/2006 | Lang | H01R 13/6594 | 439/607.04 |
| 2017/0117671 | A1 * | 4/2017 | Chang | H01R 13/6594 | |
| 2018/0212376 | A1 * | 7/2018 | Wang | H01R 13/6581 | |
| 2020/0287335 | A1 * | 9/2020 | Chuang | H01R 12/722 | |

FOREIGN PATENT DOCUMENTS

| | | | | |
|---|---|---|---|---|
| EP | 2613410 A1 * | 7/2013 | | H01R 13/64 |
| EP | 2613410 A1 | 7/2013 | | |

OTHER PUBLICATIONS

Extended European Search Report, dated Feb. 18, 2020, 9 pages.

* cited by examiner

*Primary Examiner* — Abdullah A Riyami
*Assistant Examiner* — Nader J Alhawamdeh
(74) *Attorney, Agent, or Firm* — Barley Snyder

(57) ABSTRACT

A connector shielding for a connector includes a plurality of shielding walls forming a receptacle receiving a mating connector and a guiding protrusion disposed on at least one of the shielding walls and protruding from the at least one of the shielding walls toward the receptacle. The receptacle is open in an insertion direction at a forward end for insertion of the mating connector. The shielding walls are parallel with each other at least in sections in a cross-section perpendicular to the insertion direction.

20 Claims, 4 Drawing Sheets

CONNECTOR SHIELDING WITH A GUIDING PROTRUSION

CROSS-REFERENCE TO RELATED APPLICATION

This application claims the benefit of the filing date under 35 U.S.C. § 119(a)-(d) of European Patent Application No. 19193936.2, filed on Aug. 27, 2019.

FIELD OF THE INVENTION

The present invention relates to a connector shielding and, more particularly, to a connector shielding with a guiding protrusion.

BACKGROUND

Signal connectors and connector shieldings are known in the art. A connector shielding is used for electromagnetically shielding signal contact elements in a connector from influences from outside the connector and also in order to control the impedance of the signal lines to which the signal contact elements belong. In particular in miniaturized signal connectors, for example connectors that have diameters below 10 mm or even below 5 mm, it is important that the shieldings and other parts of the connectors do not get damaged during mating of the connectors. Furthermore, it is important that, in a mated state, the position of the shieldings with respect to each other is well defined.

SUMMARY

A connector shielding for a connector includes a plurality of shielding walls forming a receptacle receiving a mating connector and a guiding protrusion disposed on at least one of the shielding walls and protruding from the at least one of the shielding walls toward the receptacle. The receptacle is open in an insertion direction at a forward end for insertion of the mating connector. The shielding walls are parallel with each other at least in sections in a cross-section perpendicular to the insertion direction.

BRIEF DESCRIPTION OF THE DRAWINGS

The invention will now be described by way of example with reference to the accompanying Figures, of which.

DETAILED DESCRIPTION OF THE EMBODIMENT(S)

In the following, the invention and its improvements are described in greater detail using exemplary embodiments and with reference to the drawings. The various features shown in the embodiments may be used independently of each other in specific applications. In the following figures, elements having the same function and/or the same structure will be referenced by the same reference signs.

Figure 1:
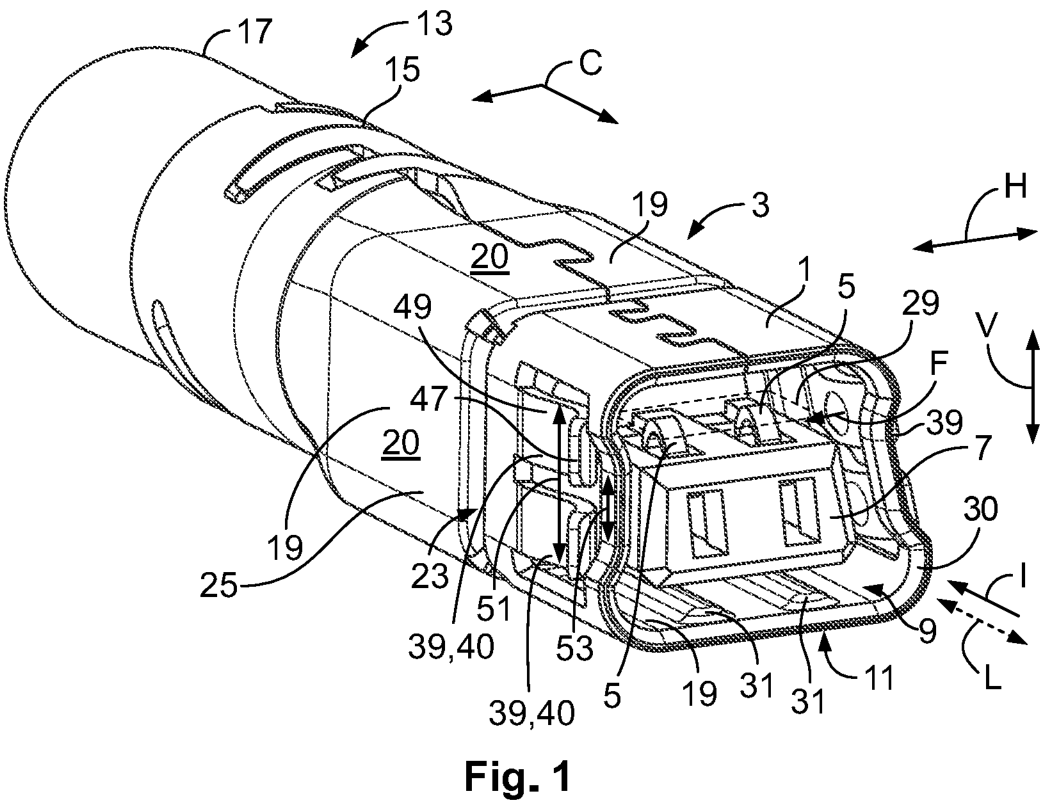
FIG. 1 is a perspective view of a connector with a connector shielding according to an embodiment.
Figure 2:
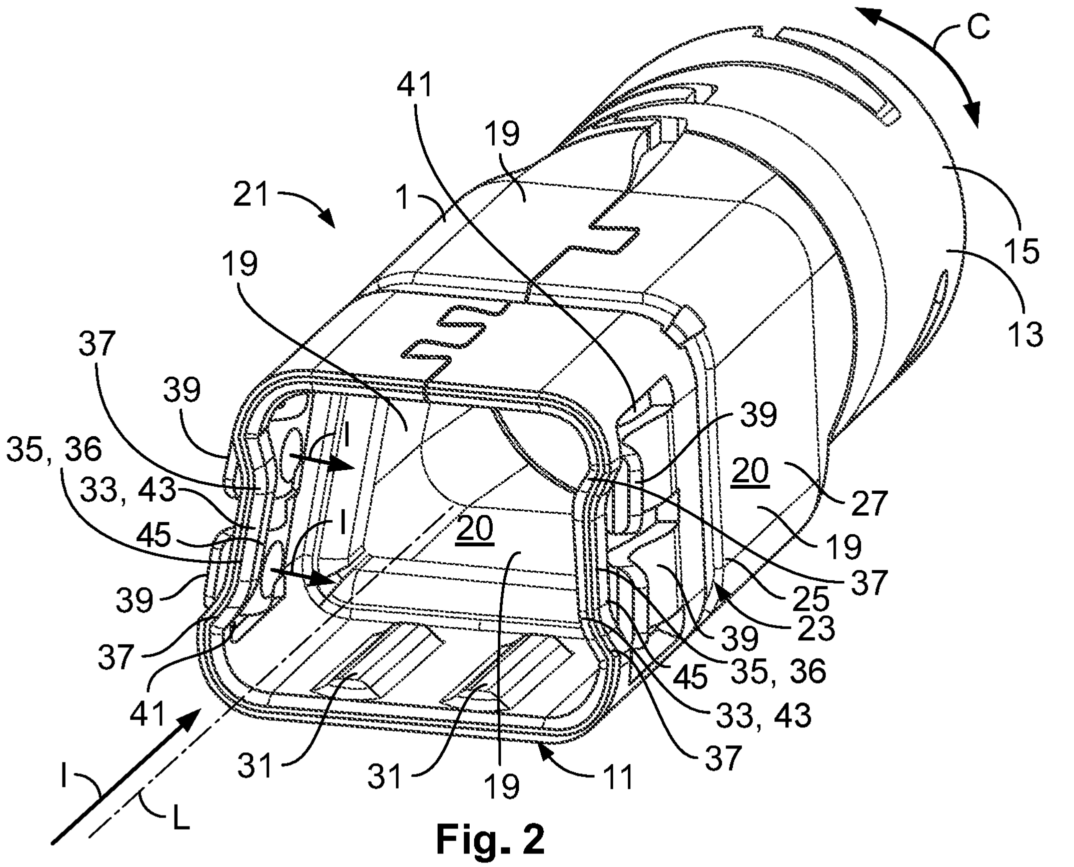
FIG. 2 is a perspective view of the connector shielding of FIG. 1.

A connector shielding 1 according to an embodiment is shown in FIGS. 1 and 2. FIG. 1 shows the shielding 1 used in a signal connector 3 and FIG. 2 shows the connector shielding 1 without any other part of the connector 3.

The signal connector 3, as shown in FIG. 1, includes a pair of signal contact elements 5 that are embedded in a contact carrier 7. The contact carrier 7 may be made from a dielectric material. The contact carrier 7 carries the signal contact elements 5. The signal contact elements 5 are surrounded by the shielding 1 along a circumferential direction C. The circumferential direction C extends around a longitudinal axis L of the shielding 1 and the connector 3. The longitudinal direction L extends parallel to an insertion direction I along which a mating connector (not shown yet) is insertable into the shielding 1.

The shielding 1 opens up a receptacle 9 for receiving a mating connector, as shown in FIG. 1. The receptacle 9 is open towards a forward end 11 of the shielding 1. The forward end 11 also forms the forward end 11 of the connector 3. At a rearward end 13, the shielding 1 is provided with a crimp barrel 15 for the connection with a cable 17. In the shown embodiment, the shielding 1 extends longitudinally from the rearward end 13 to the forward end 11 along the longitudinal axis L.

The shielding 1, at least in the region of the receptacle 9, has a rectangular or trapezoidal cross section in an embodiment. In other embodiments, other polygonal shapes are possible. In the embodiment shown in FIGS. 1 and 2, the cross section has an overall trapezoidal shape. The trapezoidal shape may be used for preventing the insertion of the connector 3 into a housing in a wrong orientation.

The shielding 1 is composed of a plurality of shielding walls 19 which, in an embodiment, are formed monolithically with each other from sheet material 27 by stamp bending. In other words, the shielding 1 is a stamp-bent part 21 as shown in the embodiment of FIG. 2. Each shielding wall 19 is basically flat and defines a plane 20.

In order to retain the connector shielding 1 in a housing, the shielding 1 has a neck section 23 that extends through the peripheral surface 25 of the shielding 1 along the circumferential direction C, as shown in FIGS. 1 and 2. The neck section 23 is formed by bending the sheet material 27 before forming the shielding walls 19 and closing the receptacle 9. The neck section 23 may be formed by a circumferential retention groove.

The two signal contact elements 5 are arranged side by side and thereby define a signal contact element plane 29 shown in FIG. 1. Two of the side walls 19 are parallel with each other and also parallel with the signal contact plane 29. The signal contact plane 29 defines a horizontal direction H that is parallel with the plane 29 and perpendicular to the insertion direction I. The signal contact plane 29 further defines a vertical direction V that is perpendicular to the signal contact plane 29. It should be noted that the terms "horizontal" and "vertical" are chosen only for descriptive reasons. They do not relate to the orientation of the connector in space, but refer to the features of the shielding and the connector and the aforementioned directions. The two shielding walls 19 that are not parallel with the signal contact plane 29 are inclined with respect to each other in order to form the overall trapezoidal shape.

One shielding wall 19 that is parallel with the signal contact plane 29 is provided with two guiding protrusions 31, as shown in FIGS. 1 and 2. The shielding wall 19 with the guiding protrusions 31 is the shielding wall 19 in FIGS. 1 and 2 that is on the lower side of the shielding 1. The guiding protrusions 31 extend longitudinally parallel with the insertion direction I and protrude perpendicular to the signal contact plane 29 into the receptacle 9. The guiding protrusions 31 have an overall rim-shape or rail-shape. The guiding protrusions 31 can be regarded as "vertical" guiding protrusion 31 since they may guide a mating connector along the vertical direction V during mating of the connectors. The guiding protrusion 31 may be formed by punching or pressing the material 27 in order to form the elongated shape that protrudes out of the shielding wall 19.

As shown in FIGS. 1 and 2, the guiding protrusions 31 are arranged between the forward end 11 and the neck section 23 along the insertion direction I. The at least one guiding protrusion 31 may be recessed from the forward end 11 along the insertion direction I. At the forward end 11, the material 27 of the shielding is chamfered or inclined to form an overall funnel-shape in order to facilitate the insertion of a mating connector into the receptacle 9. The material 27 is therefore provided with a chamfered edge 30 at the forward end 11.

In addition to the "vertical" guiding protrusions 31, the shielding 1 is provided with two more guiding protrusions 33, shown in FIG. 2. The guiding protrusions 33 are located at the shielding walls 19 that are inclined with respect to each other in order to form the trapezoidal shape. The guiding protrusion 33 protrude towards each other and into the receptacle 9. The guiding protrusions 33 basically protrude in a direction perpendicular to the insertion direction I and perpendicular to the vertical direction V. The guiding protrusions 33 may be regarded as "horizontal" guiding protrusions 33 because they may guide a mating connector along the horizontal direction H.

The "horizontal" guiding protrusion 33 may be formed by bending a strip-like portion of material 27 such that, for each protrusion 33, a straight section 35 and two bent sections 37 are formed. The straight section 35 form recessed portions 36 of the guiding protrusion 33 that are recessed into the receptacle 9 from the plane 20 of the shielding wall 19. The bent sections 37 connect the straight section 35 with the remaining shielding wall 19. At the forward end 11, each guiding protrusion 33 is provided with the chamfered edge 30, as shown in FIG. 1. Each guiding protrusion 33 has the overall shape of a bow 43, wherein the rear 45 of the bow 43 extends into the receptacle 9. The at least one recessed portion 36 may have the overall shape of a web that extends perpendicular to the insertion direction I.

The guiding protrusions 33 are made from a strip like portions of the material 27. The strip-like portions are formed by openings 41 in the material 27 of the shielding walls 19 which are arranged behind the protrusions 33 along the insertion direction I, as shown in FIG. 2.

The shielding 1 has a plurality of shield contact springs 39, shown in FIGS. 1 and 2, that are elastically deflectable out of the receptacle 9. Each shield contact spring 39 is formed as a leaf spring 40 extending parallel with the insertion direction I. In a not-mated state as shown in FIGS. 1 and 2, the shield contact springs 39 extend into the receptacle 9 and the springs 39 may get deflected out of the receptacle 9 when a mating contact is inserted into the receptacle 9. The springs 39 are deflectable perpendicular to the insertion direction I.

The openings 41 allow the shield contact springs 39 to move freely along the horizontal direction H at least with their free ends 47, as shown in FIG. 1. Each shield contact spring 39 has a base 49 at which it is connected with the corresponding shielding wall 19 and a free end 47 that extends from the base 49. Each shield contact spring 39 has an overall elongated shape that extends parallel with the insertion direction I, wherein the base 49 is located closer to the rearward end 13 and the free end 47 is located closer to the forward end 11.

As shown in FIGS. 1 and 2, into each opening 41, two shield contact springs 39 extend. The two shield contact springs 39 that are arranged on the same shielding wall 19 are arranged parallel with each other and adjacent to each other in the vertical direction V. A total height 51 of both shield contact springs 39 on the same shielding wall 19, in the embodiment shown in FIG. 1, is larger than a height 53 of the straight section 35 of the guiding protrusion 33. The shield contact springs 39 are arranged opposite each other on opposite shielding walls 19 about the receptacle 9.

Along the insertion direction I, the guiding protrusions 33 at least partially overlap the shield contact springs 39 in order to protect the same when mating the connectors.

Figure 3:
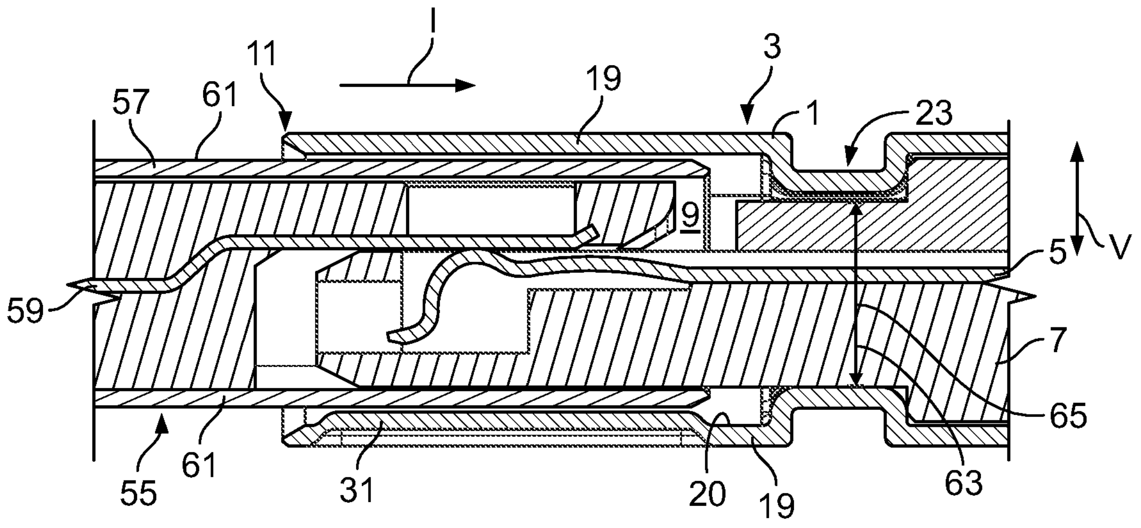
FIG. 3 is a sectional side view of the connector of FIG. 1 with an inserted mating connector.

Reference is now made to FIG. 3, in which the signal connector 3 shown in FIGS. 1 and 2 is shown in a partially mated state. In the partially mated state, a mating connector 55 is arranged in the receptacle 9. FIG. 3 shows the connectors 3 and 55 along a cross sectional cut that extends through a signal contact element 5 parallel with the insertion direction I and the vertical direction V.

The mating connector 55 is provided with a shielding 57, shown in FIG. 3, for electromagnetically shielding a plurality of signal contact elements 59 of the mating connector 55. The mating connector 55 may be formed as a connector 3, in particular the shielding 57 may be formed as a shielding 1 according to the invention. However, in the embodiment shown in FIG. 3, the shielding 57 of the mating connector 55 is not provided with a guiding protrusion. In the mated state, each signal contact element 5 is electrically connected to a corresponding signal contact element 59 of the mating connector 55.

The shielding 57 is, as is also the shielding 1, formed by shielding walls 61. The shielding 57, in the shown embodiment, is formed with a cross-sectional shape that corresponds to the trapezoidal shape of the shielding 1. In the mated state, the outer side of the shielding 57 abuts the inner side of the shielding 1. Furthermore, the shield contact springs 39 apply a contact force F against the shielding 57, thereby holding the same in place and fixing the connectors 3, 55 in a force-fitting manner. The guiding protrusions 31 may abut the shielding 57 and prevent the shielding 57 from movement, in particular from tilting movement along the vertical direction V.

In particular in the case that the shielding 1 is provided with a neck section 23, the guiding protrusion 31 may be necessary for compensating a cross section reduction of the contact carrier 7. In other words, in order to insert the contact carrier 7 into the shielding 1 during manufacturing of the signal connector 3, as shown in FIG. 3, the whole contact carrier 7 may have a diameter 63 that is smaller than the inner diameter 65 of the shielding 1 in the region of the neck section 23. However, due to this requirement, the contact carrier 7 is spaced apart from the shielding wall 19 in the receptacle 9. The guiding protrusion 31 may compensate this and may abut the shielding 57 in the mated state. The guiding protrusion 31 may in particular in this case form a spacer for spacing the shielding wall apart 19 from an inserted shielding wall 61 of the mating connector 55. In the fully mated state, the at least one shielding wall 61 of the mating connector 55 is arranged between the at least one guiding protrusion 31 and the at least one contact carrier 7. Tilting of the connector shielding 1 with respect to the mating connector 55 may thereby be prevented.

In the mated state, the shielding wall 61 of the mating connector 55 is arranged between the contact carrier 7 and the guiding protrusion 31 without play. On the opposite side of the receptacle 9, the shielding wall 61 of the mating connector 55 may directly abut the shielding wall 19 of the shielding 1. However, it may also be possible to provide said shielding wall 19 with at least one further guiding protrusion 31 opposite the guiding protrusion 31 across the receptacle 9.

The at least one guiding protrusion 31, 33 may guide the mating connector 55, in particular the shielding 57 thereof, during mating of the two connectors 3, 55. It may further protect the shielding wall 19 during mating of the connectors 3, 55, in particular during mating of the two shieldings 1, 57. The at least one guiding protrusion 31, 33 defines the position of the two connectors 3, 55 with respect to each other in the mated state, in particular in a direction perpendicular to the insertion direction I. The mating connector 55 is first guided by the chamfered edge 30 and afterwards by the at least one guiding protrusion 31, 33 until it reaches the mated position. At least a portion of the mating connector 55 may be formed as a wedge in order to interact with the chamfered edge 30 and thereby to facilitate the insertion of one connector into the other.

The at least one guiding protrusion 31, 33 provides a synergetic effect since the shielding 1 itself may guide the mating connector 55. Additional guiding means, for example on a connector housing, can be omitted. The mating of the shieldings 1, 57 allows for a well-defined relative position of two connector shieldings 1, 57 with respect to each other in a mated state.

In the following, additional embodiments of the connector 3 and the mating connector 55 are described with respect to FIGS. 4 to 8. For the sake of brevity, only the differences to the aforementioned embodiment are described in detail.

Figure 4:
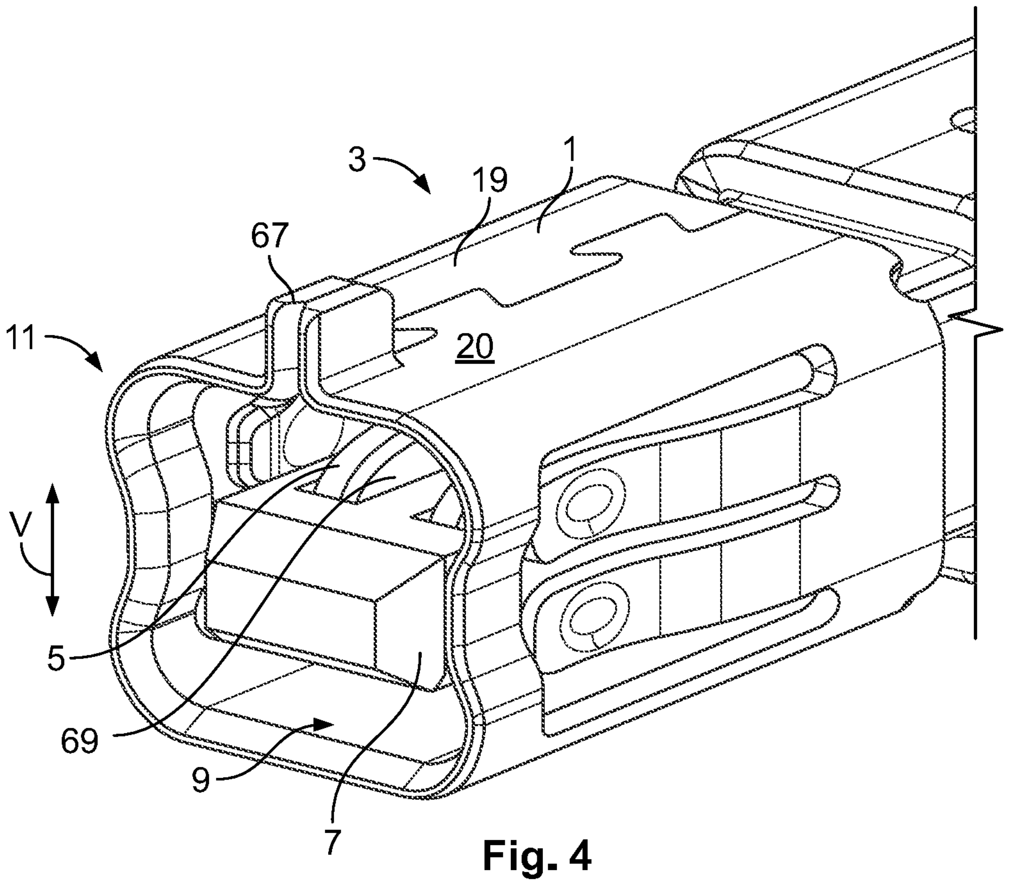
FIG. 4 is a perspective view of a connector with a shielding according to another embodiment.

FIG. 4 shows a signal connector 3 with a connector shielding 1. In contrast to the aforementioned embodiment, the shielding 1 is provided with an overall rectangular shape instead of a trapezoidal shape. Furthermore, "vertical" guiding protrusions 31 are omitted. Finally, at the forward end 11, the shielding 1 is provided with a nose 67 that protrudes from a plane 20 of the shielding wall 19 along the vertical direction V. The nose 67 is intended for preventing a wrongly orientated insertion of the shielding 1 into a connector housing. Such a connector housing, in an embodiments, has a complementary groove into which the nose 67 may be inserted.

The contact carrier 7 is provided with through-holes 69 that allow the signal contact elements 5 to extend through the through-holes 69 towards a side of the receptacle 9 that is opposite to the nose 67, as shown in FIG. 4. The through-holes 69 allow a movement of the signal contact elements 5 in particular when the connector 3 is mated with a mating connector 55. The signal contact elements 5 may then be elastically deflected and extend into the through-holes 69.

Figure 5:
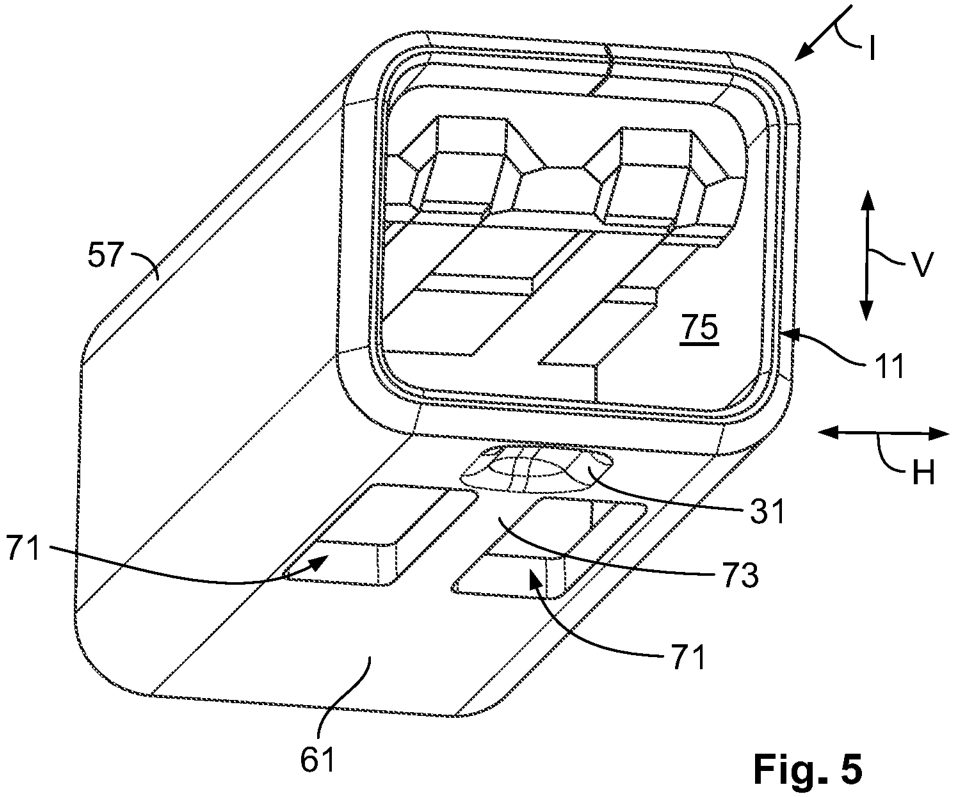
FIG. 5 is a perspective view of a connector with a shielding that is insertable into the connector of FIG. 4.

In order to prevent the signal contact elements 5 from contacting the shielding wall 61 of the shielding 57, as shown in FIG. 5, the shielding wall 61 is provided with openings 71 that may receive at least the free ends of the signal contact elements 5 in a mated position. The openings 71 are preferably arranged side-by-side along the horizontal direction H and are separated by a web 73 that extends parallel with an insertion direction I of the shielding 57. It should be noted that the shielding 57 of the second embodiment may be formed as a shielding 1 according to the invention since it is provided with a receptacle 75 into which the contact carrier 7 of the signal connector 3 may be inserted. Furthermore, the shielding 57 is provided with a guiding protrusion 31.

Figure 6:
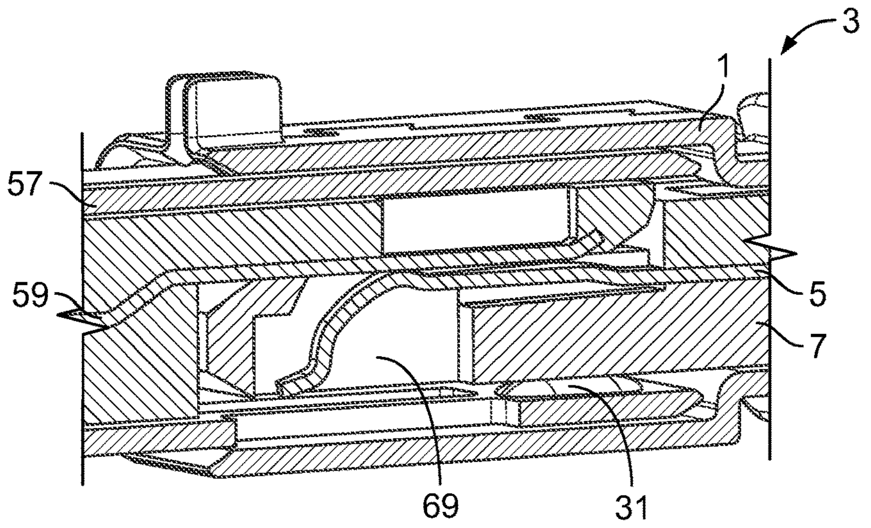
FIG. 6 is a sectional side view of a connector with a shielding according to another embodiment and an inserted mating connector.

A first embodiment of the guiding protrusion 31 that is shown in FIGS. 5 and 6 is arranged between the web 73 and the forward end 11. In the mated state, as shown in FIG. 6, the guiding protrusion 31 abuts the contact carrier 7 of the connector 3.

Figure 7:
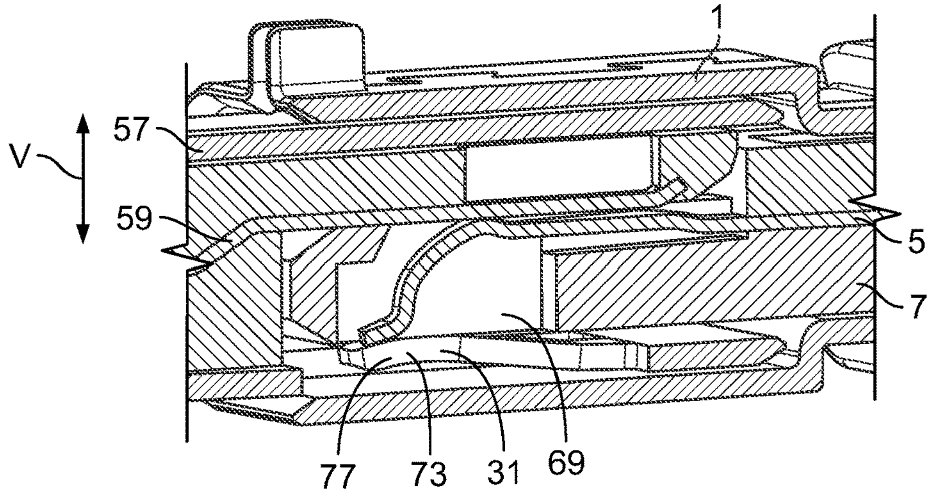
FIG. 7 is a sectional side view of a connector with a shielding according to another embodiment and an inserted mating connector.

In a further embodiment of the guiding protrusion 31 of the second embodiment of the mating connector 55, shown in FIG. 7, the guiding protrusion 31 is formed as an elastically deflectable leaf spring 77 that is formed by the web 73. In other words, the web 73 is only connected to the remaining shielding 57 with one of its ends such that it is movable along the vertical direction V. The leaf spring 77 may be pre-bent towards the receptacle 75 such that it is elastically deflected out of said receptacle 75 when the contact carrier 7 is arranged inside the receptacle 75.

Figure 8:
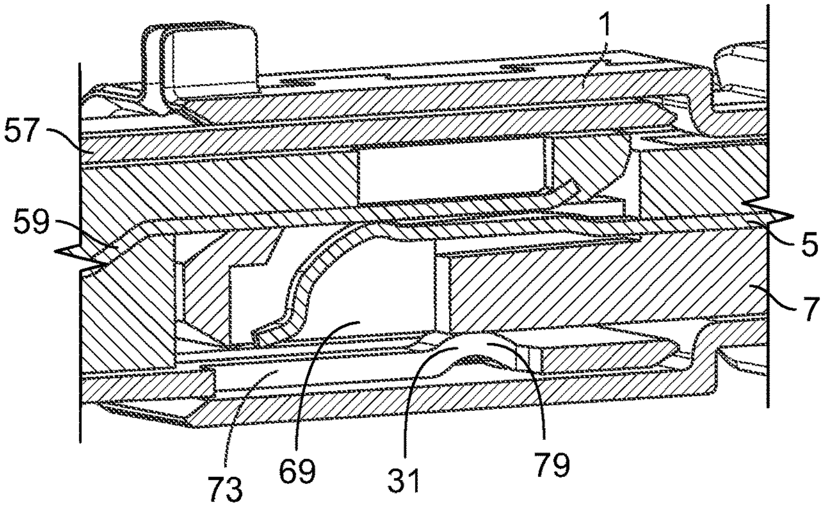
FIG. 8 is a sectional side view of a connector with a shielding according to another embodiment and an inserted mating connector.

A third embodiment of the guiding protrusion 31 is shown in FIG. 8. The guiding protrusion 31 is formed on the web 73 by a curved section 79 in which the web 73 protrudes into the receptacle 75, thereby forming the guiding protrusion 31.

What is claimed is:

1. A connector shielding for a connector, comprising:

a plurality of shielding walls forming a receptacle receiving a mating connector, the receptacle is open in an insertion direction at a forward end for insertion of the mating connector, the shielding walls are parallel with each other at least in sections in a cross-section perpendicular to the insertion direction;

a guiding protrusion disposed on at least one of the shielding walls and protruding from the at least one of the shielding walls toward the receptacle; and a shield contact spring extending into the receptacle and generating a contact force in a direction toward the receptacle, the shield contact spring is deflectable with respect to the guiding protrusion.

2. The connector shielding of claim 1, wherein the guiding protrusion is arranged between the shield contact spring and the forward end.

3. The connector shielding of claim 2, wherein the guiding protrusion and the shield contact spring at least partially overlap along the insertion direction.

4. The connector shielding of claim 2, wherein the shield contact spring is a leaf spring extending parallel with the insertion direction.

5. The connector shielding of claim 2, wherein the guiding protrusion has a recessed portion recessed from a plane of the at least one shielding wall toward the receptacle.

6. The connector shielding of claim 5, wherein the guiding protrusion has a shape of a bow, a rear of the bow extends toward the receptacle.

7. The connector shielding of claim 2, further comprising at least one further guiding protrusion.

8. The connector shielding of claim 7, wherein at least a pair of guiding protrusions are arranged on the shielding walls opposite each other across the receptacle.

9. The connector shielding of claim 1, further comprising a pair of openings in one of the shielding walls, the openings receiving a plurality of signal contact elements.

10. The connector shielding of claim 9, wherein the openings are arranged side by side perpendicular to the insertion direction, the guiding protrusion is formed on a web between the openings.

11. The connector shielding of claim 1, further comprising a neck section extending in a peripheral surface of the connector shielding perpendicular to the insertion direction.

12. The connector shielding of claim 11, wherein the guiding protrusion is arranged between the forward end and the neck section.

13. The connector shielding of claim 1, wherein the connector shielding is a stamp-bent part.

14. The connector shielding of claim 13, wherein the guiding protrusion is formed monolithically with at least one of the shielding walls.

15. A connector, comprising:

a signal contact element; and a connector shielding at least partially surrounding the signal contact element, the connector shielding including a plurality of shielding walls forming a receptacle receiving a mating connector, a guiding protrusion disposed on at least one of the shielding walls and protruding from the at least one of the shielding walls toward the receptacle, and a shield contact spring extending into the receptacle and generating a contact force in a direction toward the receptacle, the receptacle is open in an insertion direction at a forward end for insertion of the mating connector, the shielding walls are parallel with each other at least in sections in a cross-section perpendicular to the insertion direction, the shield contact spring is deflectable with respect to the guiding protrusion.

16. The connector of claim 15, further comprising a neck section and a contact carrier for the signal contact element, the contact carrier extends into the receptacle through the neck section.

17. The connector of claim 16, wherein a portion of the contact carrier that extends into the receptacle has a diameter that is equal or smaller than an inner diameter of the neck section.

18. A connector assembly, comprising:

a connector; and a mating connector matable with the connector, the connector includes a signal contact element and a connector shielding at least partially surrounding the signal contact element, the connector shielding including a plurality of shielding walls forming a receptacle receiving the mating connector, a guiding protrusion disposed on at least one of the shielding walls and protruding from the at least one of the shielding walls toward the receptacle, and a shield contact spring extending into the receptacle and generating a contact force in a direction toward the receptacle, the receptacle is open in an insertion direction at a forward end for insertion of the mating connector, the shielding walls are parallel with each other at least in sections in a cross-section perpendicular to the insertion direction, the shield contact spring is deflectable with respect to the guiding protrusion.

19. The connector assembly of claim 18, wherein at least one of a plurality of shielding walls of the mating connector is arranged between the guiding protrusion and a contact carrier of the connector in a fully mated state.

20. A connector shielding for a connector, comprising:

a plurality of shielding walls:

(a) forming a receptacle receiving mating connector that is open in an insertion direction at a forward end for insertion of the mating connector, (b) disposed in parallel with each other in sections in a cross-section perpendicular to the insertion direction, and (c) one of which has a pair of openings arranged side by side perpendicular to the insertion direction and receive a plurality of signal contact elements;

a receptacle;

(a) receiving a mating connector, and (b) open in an insertion direction at a forward end for insertion of the mating connector; and a guiding protrusion;

(a) on and protruding from one of the shielding walls, (b) on a web between the openings, and (c) a guiding protrusion disposed on at least one of the shielding walls and protruding from the at least one of the shielding walls toward the receptacle.

* * * * *